US012763101B2

(12) United States Patent
O'Brien

(10) Patent No.: US 12,763,101 B2
(45) Date of Patent: Oct. 13, 2026

(54) CAPACITIVE HEIGHT SENSING ELECTRONICS FOR HARD DISK DRIVE APPLICATION

(71) Applicant: Avago Technologies International Sales Pte. Limited, Singapore (SG)

(72) Inventor: Scott O'Brien, Eden Prairie, MN (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 18/979,897

(22) Filed: Dec. 13, 2024

(65) Prior Publication Data

US 2026/0171117 A1 Jun. 18, 2026

(51) Int. Cl.
*G11B 5/60* (2006.01)

(52) U.S. Cl.
CPC .................................. *G11B 5/6017* (2013.01)

(58) Field of Classification Search
CPC .................................................... G11B 5/6017
See application file for complete search history.

(56) References Cited

U.S. PATENT DOCUMENTS

| | | | | |
|---|---|---|---|---|
| 11,120,826 | B1 * | 9/2021 | Johnson | G11B 5/6029 |
| 2011/0267309 | A1 * | 11/2011 | Hanauer | G06F 3/0446 345/174 |
| 2012/0250484 | A1 * | 10/2012 | Polley | G11B 21/21 |
| 2018/0329440 | A1 * | 11/2018 | Jefremow | G05F 1/575 |

* cited by examiner

*Primary Examiner* — Steven Lim
*Assistant Examiner* — Michelle J. Kim
(74) *Attorney, Agent, or Firm* — Quarles & Brady LLP

(57) ABSTRACT

An assembly including a capacitive height sensor and a conditioning circuit. The capacitive height sensor detects capacitance between a read/write head and a disk surface to monitor variances in a flying height. To bring about a measurement voltage between the capacitive height sensor and the disk surface, the conditioning circuit supplies a drive current to the capacitive height sensor. The conditioning circuit ceases flowing the drive current to the capacitive height sensor upon detecting that the measurement voltage is greater than a high threshold, and commences flowing the drive current to the capacitive height sensor upon detecting that the measurement voltage is less than a low threshold.

18 Claims, 8 Drawing Sheets

*Measurement Voltage V(chs)*

CAPACITIVE HEIGHT SENSING ELECTRONICS FOR HARD DISK DRIVE APPLICATION

BACKGROUND

In a hard disk drive, a capacitive sensor can measure capacitance changes based on a flying height, which is the distance between the read/write head and the disk platter. By providing real-time feedback, the capacitive sensor enables a control system to adjust the flying height.

BRIEF DESCRIPTION OF DRAWINGS

The accompanying drawings, which are incorporated in and form a part of this specification, illustrate examples of the disclosure and, together with the description, explain principles of the examples.

Figure 1:
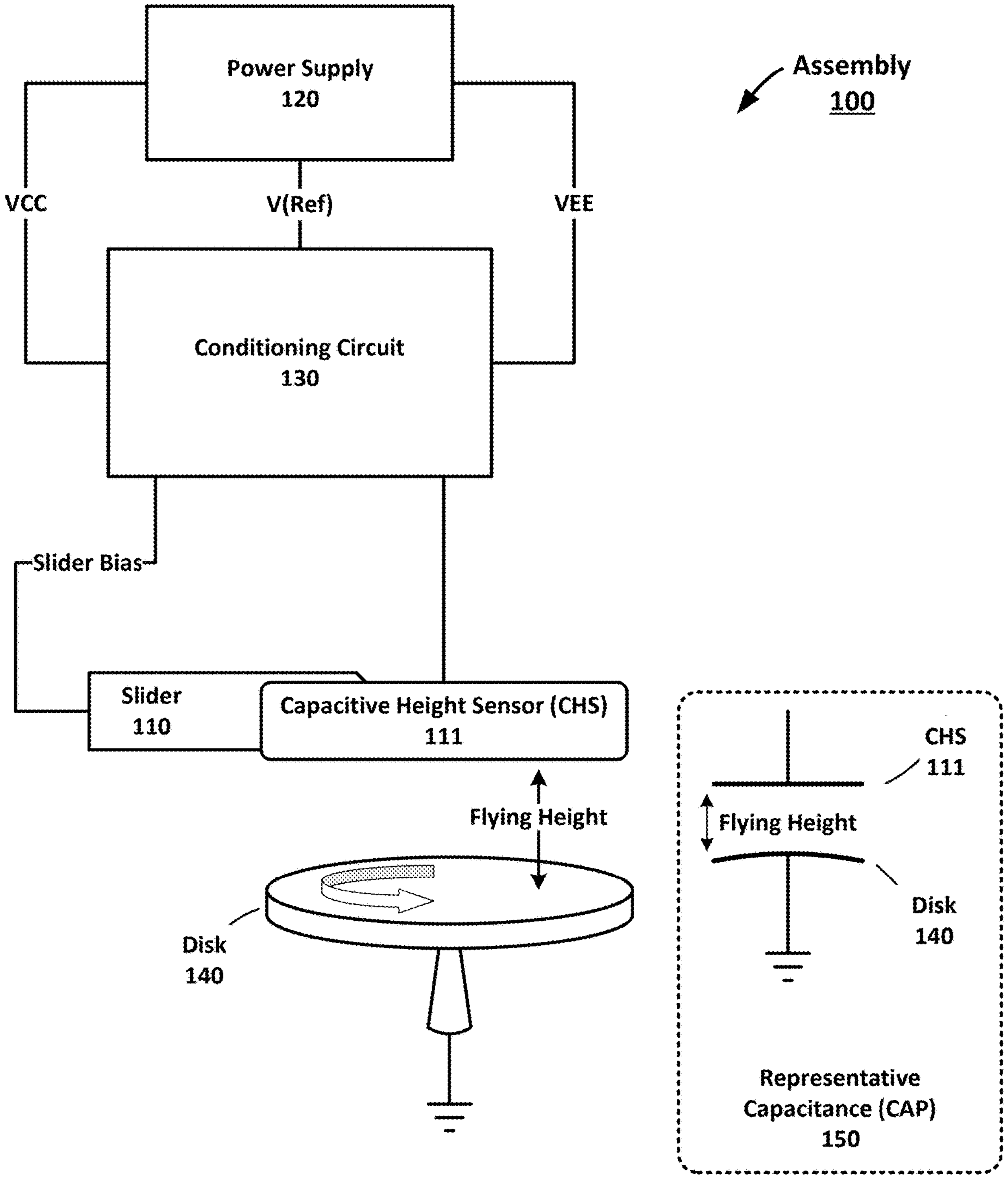
FIG. 1 illustrates an exemplary assembly, in accordance with one or more embodiments of the disclosure.

In the drawings, like reference symbols and numerals indicate the same or similar components. Like elements in the various figures are denoted by like reference symbols and numerals for consistency. Unless otherwise indicated, like elements and method steps are referred to with like reference numerals.

DETAILED DESCRIPTION OF THE INVENTION

The following describes technical solutions in this specification with reference to the accompanying drawings. Exemplary embodiments are described in detail with reference to the accompanying drawings.

The terminology used herein is for describing various examples only, and is not to be used to limit the disclosure. Unless otherwise defined, all terms, including technical and scientific terms, used herein have the same meaning as commonly understood by one of ordinary skill in the art to which this disclosure pertains and after an understanding of the disclosure of this application.

Terms, such as those defined in commonly used dictionaries, are to be interpreted as having a meaning that is consistent with their meaning in the context of the relevant art and the disclosure of this application. Although the present technology has been described by referring to certain examples, workers skilled in the art will recognize that changes may be made in form and detail without departing from the scope of the discussion.

Because of the significant effect of head spacing loss, hard disk drive manufactures have been employing methods to reduce the flying height for many generations.

The first generation of hard disk drives that utilized a dedicated component to reduce the flying height added a resistive heating element in which a preamplifier adjusted power between Read and Write modes to better match the flying height between the two primary modes of operation.

The second generation of hard disk drives added another sensor commonly called the flying height sensor (FHS). The FHS has electrical characteristics which change when the FHS comes in close proximity to a rotating disk. The FHS enabled a further reduction in flying height and thus, an increase in areal density. However, one difficulty with FHS is that often times physical contact with the rotating disk occurs which causes sensor degradation or even damage to the FHS. Accordingly, there is a need in the art for an improved apparatus for monitoring the flying height.

Referring to FIG. 1, assembly 100 is illustrated. Assembly 100 may include slider 110, power supply 120 and conditioning circuit 130. Those skilled in the art will appreciate there may be additional components in assembly 100.

In a device such as a hard disk drive, slider 110 is a component that may hover over disk 140 while a read/write head (not shown) reads data from and writes data to the magnetic disk platters. To read data and/or write data, slider 110 may hover just above the surface of disk 140 at a microscopic distance while disk 140 is rotating so that the read/write head may detect or alter magnetic fields in disk 140.

Slider 110 may include capacitive height sensor 111 (CHS) 111. To monitor variances in a flying height while disk 140 is rotating, capacitive height sensor 111 may detect capacitance between capacitive height sensor 111 and a surface of disk 140 without the risk of slider 110 coming into contact with disk 140. Referred to herein, a “flying height” is the distance between capacitive height sensor 111 and a target object. Those skilled in the art will appreciate there may be additional components in slider 110.

In the example of FIG. 1, the target object may exist as the surface of disk 140. Representative capacitance 150 may illustrate an effective relationship between capacitive height sensor 111 and the surface of disk 140, with capacitive height sensor 111 being characterized as one plate of representative capacitance 150 and disk 140 being characterized as another plate of representative capacitance 150.

Capacitive height sensor 111 may exhibit a stable capacitance when farther from a target object and a different capacitance when closer to the target object. To precisely monitor the flying height, capacitive height sensor 111 may measure or detect a sensing capacitance between capacitive height sensor 111 and the target object. Referred to herein, “sensing capacitance” is the capacitance measured or detected by capacitive height sensor 111 in response to changes in the flying height. The sensing capacitance may happen to change inversely to the distance between capacitive height sensor 111 and the target object. Specifically, the sensing capacitance may increase as the distance between capacitive height sensor 111 and target object decreases. Conversely, an increasing distance between capacitive height sensor 111 and target object may cause the sensing capacitance to decrease.

Power supply 120 may convert power from an external power source into constant, unvarying direct current (DC) voltages VCC and VEE despite any fluctuation in load conditions on conditioning circuit 130. Positive voltage VCC may be a voltage potential that is positive relative to ground. Negative voltage VEE may be a voltage potential that is negative relative to ground. Power supply 120 may output voltages VCC and VEE to conditioning circuit 130.

Conditioning circuit 130 is an apparatus that may be implemented as a pre-driver, a pre-amplifier, a pre-stage driver, a signal conditioner, an intermediate driver, and/or any other electronic circuitry that may condition or amplify current.

Figure 2:
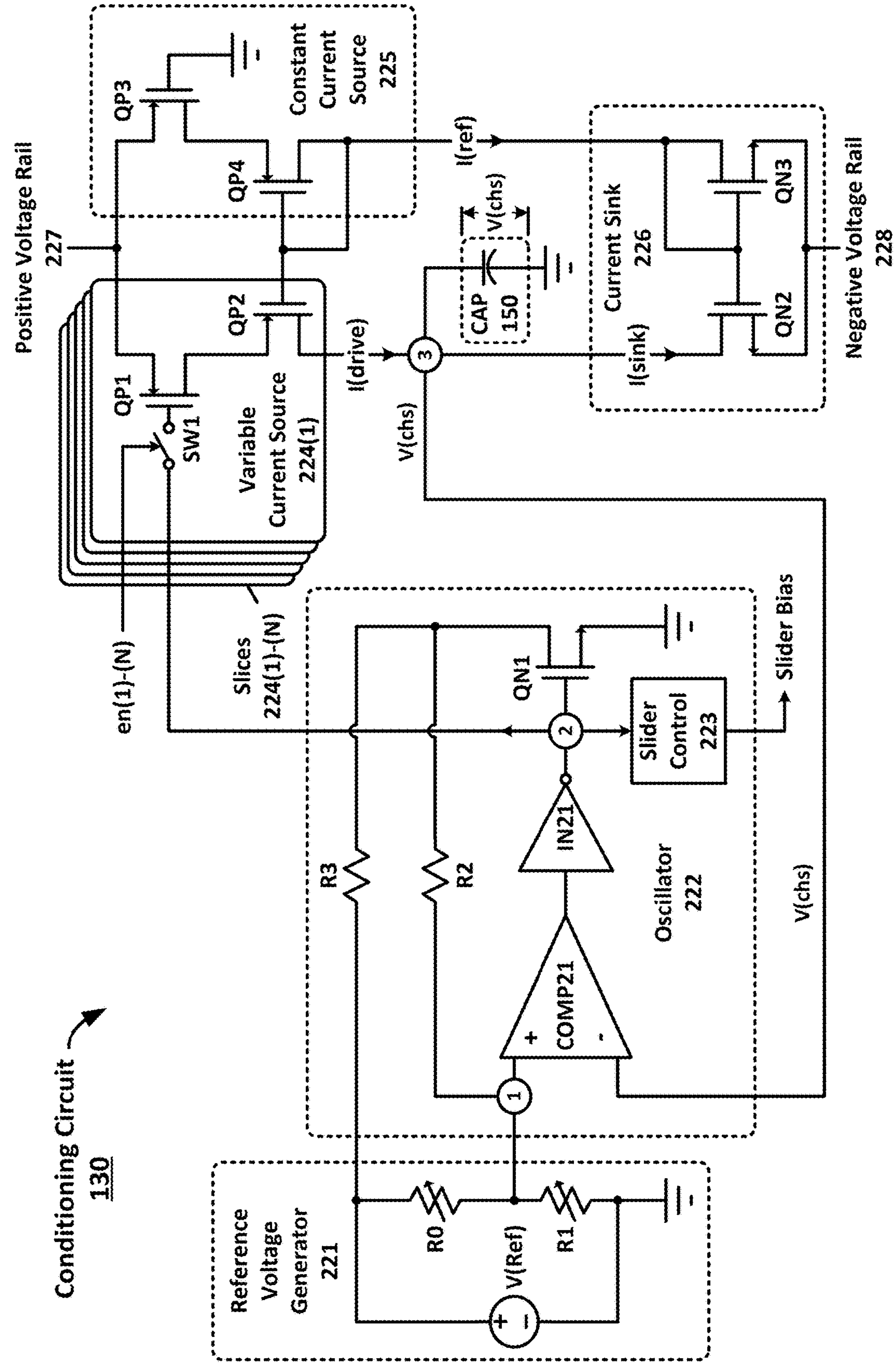
FIG. 2 illustrates an exemplary conditioning circuit, in accordance with one or more embodiments of the disclosure.

Turning now to FIG. 2, conditioning circuit 130 is illustrated. Conditioning circuit 130 may include reference voltage generator 221 and oscillator 222. Oscillator 222 may include slider control 223. Conditioning circuit 130 may also include variable current source 224, constant current source 225, current sink 226, positive voltage rail 227 and negative voltage rail 228. Conditioning circuit 130 may output positive voltage VCC onto positive voltage rail 227 and may output negative voltage VEE onto negative voltage rail 228. Those skilled in the art will appreciate there may be additional components in conditioning circuit 130.

Components of conditioning circuit 130 are electrically connected directly to one another in the manner illustrated by the example of FIG. 2. Referred to herein, "electrically connected directly," "electrically directly connected" and "directly electrically connected" mean that two or more components are connected along a conductive path without any intermediary component therebetween.

Reference voltage generator 221 is a circuit that may output a reference voltage to node 1. An electrical power supply V(Ref) in reference voltage generator 221 may output a stable, precise DC voltage. Also included in reference voltage generator 221 are variable resistances R0, R1. Variable resistance R0 is a passive electronic component whose resistance value is adjustable manually and/or electronically. Variable resistance R1 is another passive electronic component whose resistance value is adjustable manually and/or electronically. Resistance values for variable resistances R0 and R1 are adjustable independently from one another. Variable resistances R0 and R1 in reference voltage generator 221 may exist as a resistive voltage divider circuit. Voltage source V(Ref) is electrically connected directly to variable resistances R0, R1. Variable resistance R1 is electrically connected directly to variable resistance R0 and ground. Those skilled in the art will appreciate there may be additional components in reference voltage generator 221.

In addition to slider control 223, oscillator 222 may include comparator COMP21, inverter IN1, transistor QN1 and fixed resistors R2, R3. Transistor QN1 is electrically connected directly to switch SW1, fixed resistors R2, R3, inverter IN21 and ground. Those skilled in the art will appreciate there may be additional components in oscillator 222.

Comparator COMP21 is an operation amplifier with non-inverting input terminal (+), inverting input terminal (−) and a single output. Node 1 is electrically connected directly to variable resistances R0, R1, fixed resistor R2 and non-inverting input terminal (+). Fixed resistor R3 is electrically connected directly to variable resistance R0, fixed resistor R2 and transistor QN1.

Inverter IN21 is a circuit that may receive a signal from comparator COMP21 and produce an output that is the logical complement of the signal.

Illustrated in FIG. 2 is a plurality of identical slices 224(1)-(N), with "N" being an integer. Slices 224(1)-(N) are electrically connected in parallel with one another. Each slice 224 may include switch SW1 and transistors QP1, QP2. Slices 224(1)-(N) may be collectively referred to as "variable current source 224." Any one of the slices 224(1)-(N) may be individually referred to as "variable current source 224." In each slice 224, transistor QP1 is electrically connected directly to inverter switch SW1, positive voltage rail 227 and transistors QP2, QP3. Also in each slice 224, transistor QP2 is electrically connected directly to comparator COMP21. Those skilled in the art will appreciate there may be additional components in slices 224(1)-(N).

Constant current source 225 may exist as circuitry that receives the positive voltage VCC from positive voltage rail 227 and transforms the positive voltage VCC into a reference current. The amplitude of the reference current is a constant, unvarying amplitude. The amplitude of drive current I(drive) is proportional to the amplitude of the reference current.

Constant current source 225 may include transistors QP3, QP4. Positive voltage rail 227 is electrically connected directly to transistors QP3, QP4. Transistor QP4 is electrically connected directly to transistors QP2 and QP3. Constant current source 225 is circuitry that supplies a fixed, stable reference current I(ref) to current sink 226. Those skilled in the art will appreciate there may be additional components in constant current source 225.

Current sink 226 may exist as circuitry that draws a sink current I(sink) to negative voltage rail 228. Current sink 226 may draw a fixed amount of reference current I(ref) from constant current source 225. Current sink 226 may include transistors QN2, QN3 arranged in a mirror configuration. Transistors QN2, QN3 are electrically connected directly to negative voltage rail 228. Those skilled in the art will appreciate there may be additional components in current sink 226.

Slide controller 223 may convert measurement voltage V(chs) into a square wave.

Any of the transistors QN1-QN3 and QP1-QP4 may be implemented as a Field Effect Transistor (FET), a metal-oxide-semiconductor (MOS) transistor and/or any other switching device. Those skilled in the art will appreciate that a direct electrical connection may exist between any other component as illustrated by the example of FIG. 2.

Figure 3:
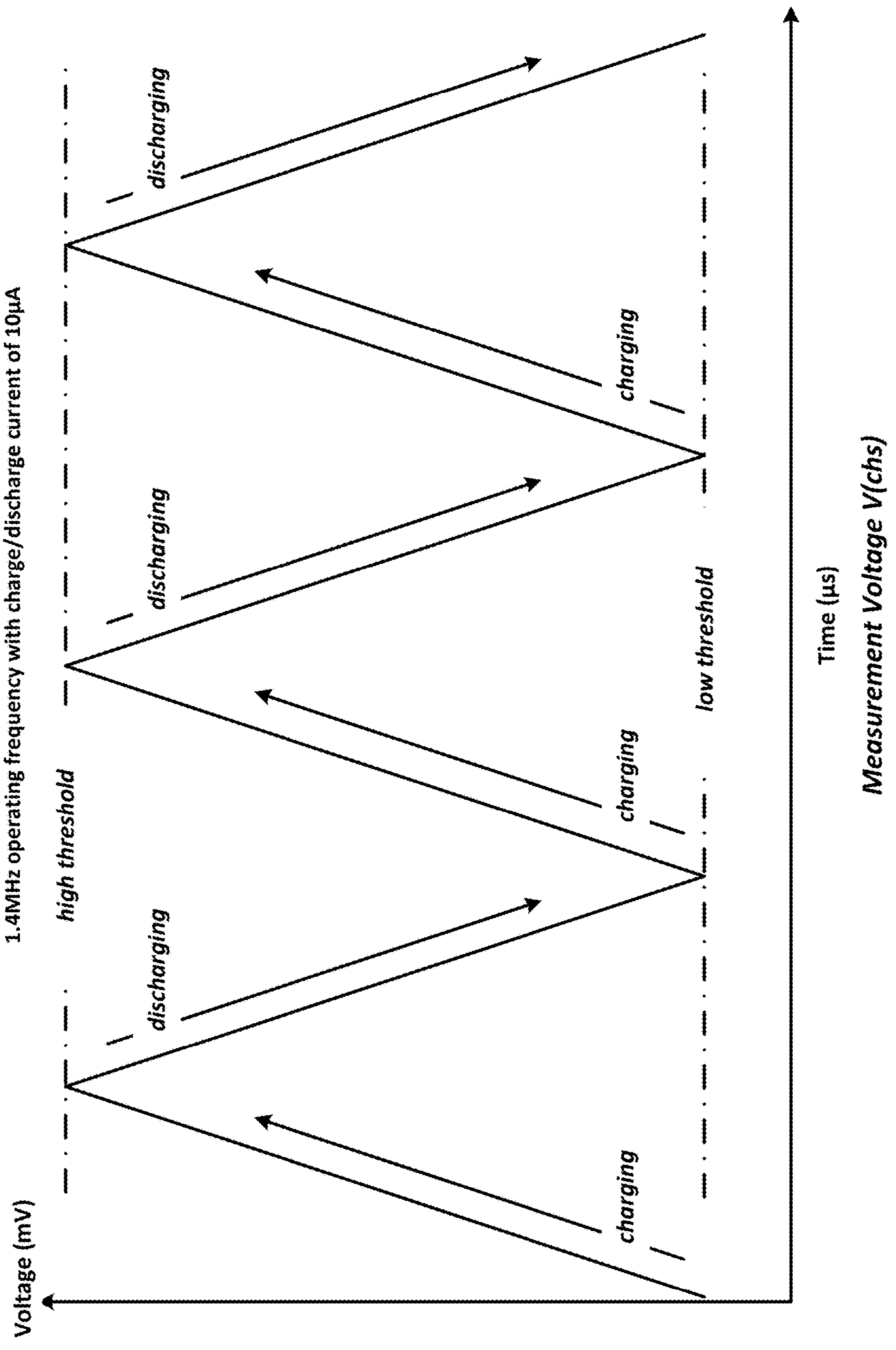
FIG. 3 illustrates an exemplary measurement voltage, in accordance with one or more embodiments of the disclosure.

Turning now to FIG. 3, an example measurement voltage V(chs) at node 3 is illustrated. Referred to herein, measurement voltage V(chs) may be any periodic waveform. A periodic waveform is a signal that repeats itself at regular intervals over time. In the example of FIG. 3, measurement voltage V(chs) may exist as a triangle wave. However, those skilled in the art will appreciate that measurement voltage V(chs) may exist in the form of a rectangular wave, a sine wave, a sawtooth wave and/or any other periodic waveform.

Variable current source 224 exist as circuitry that receives the positive voltage VCC from positive voltage rail 227 and transforms the positive voltage VCC into a drive current I(drive).

Variable current source 224 may flow the drive current I(drive) to capacitive height sensor 111. In cases where variable current source 224 supplies the drive current I(drive) to capacitive height sensor 111, the drive current I(drive) may cause a measurement voltage V(chs) to appear between capacitive height sensor 111 and a target object. Capacitive height sensor 111 may accumulate a charge in response to receiving the drive current I(drive). In some implementations, an operating frequency of 1.4 MHz for measurement voltage V(chs) may happen to be the result of a 10 μA drive current I(drive), as illustrated by the example of FIG. 3.

Turning now to FIG. 2, non-inverting input terminal (+) of comparator COMP21 is electrically connected directly to node 1. Inverting input terminal (−) of comparator COMP21 is electrically connected directly to node 3. Comparator COMP21 may compare measurement voltage V(chs)

appearing at node 3 against a reference voltage appearing at node 1 to detect whether measurement voltage V(chs) is greater than the high threshold or less than the low threshold. The high threshold may happen to be a first threshold and the low threshold may happen to be a second threshold.

During each charging half-cycle of the periodic waveform for measurement voltage V(chs), variable current source 224 may drive the drive current I(drive) to capacitive height sensor 111 from the positive voltage VCC. Drive current I(drive) may charge capacitive height sensor 111 from a low threshold to a high threshold. The high threshold is a voltage level higher than the low threshold. Upon detecting that measurement voltage V(chs) is greater than the high threshold, oscillator 222 may cause variable current source 224 to cease flowing the drive current I(drive). Current sink 226 may discharge capacitive height sensor 111 in response to oscillator 22 causing variable current source 224 to cease flowing the drive current I(drive). Oscillator 222 may set the reference voltage to the low threshold upon detecting that the measurement voltage V(chs) is greater than the high threshold.

During each discharging half-cycle of the periodic waveform for measurement voltage V(chs), current sink 226 may draw a sink current I(sink) to negative voltage rail 228. Drawing the sink current I(sink) to the negative voltage rail 228 may discharge capacitive height sensor 111 from the high threshold to another low threshold. Upon detecting that measurement voltage V(chs) is less than the low threshold, oscillator 222 may cause variable current source 224 to commence flowing the drive current I(drive). Oscillator 222 may set the reference voltage to the high threshold upon detecting that the measurement voltage V(chs) is less than the high threshold.

Variable current source 224 may include a plurality of slices 224(1)-(N). Each slice 224 may individually flow a predetermined amount of the drive current I(drive) to node 3. Conditioning circuit 130 may activate or deactivate any of the slices 224 to modify the amplitude of the drive current I(drive).

The operating frequency of measurement voltage V(chs) is proportional with the amplitude of drive current I(drive). As a result of individually flowing a predetermined amount of the drive current I(drive), each slice 224 may independently adjust the total amplitude of drive current I(drive). Adjusting the total amplitude of drive current I(drive) may modify the operating frequency of measurement voltage V(chs).

To illustrate, conditioning circuit 130 may provide enable signal en(k) to slice 224(*k*). In this example, slice 224(*k*) is one of the slices 224 and enable signal en(k) is one of the enable signals en(1)-(N). Through enable signal en(k), conditioning circuit 130 may control the opening and closure of SW1 in slice 224(*k*). Closure of switch SW1 in slice 224(*k*) may activate slice 224(*k*). Likewise, opening switch SW1 in slice 224(*k*) may deactivate slice 224(*k*). The number of slices 224 that are operable is a user-selectable parameter.

Modifying the amplitude of the drive current I(drive) may regulate the total amount of drive current I(drive) that variable current source 224 may flow to node 3. Selecting a greater number of slices 224 may cause variable current source 224 to drive a larger amount of the drive current I(drive) than in such instances where a lesser number of slices 224 is selected. For example, conditioning circuit 130 may increase the number of slices 224 that are activated to increase the amplitude of the drive current I(drive). On such occasions, an increase the number of slices 224 that are activated may cause an increase in the operating frequency of measurement voltage V(chs).

Likewise, conditioning circuit 130 may decrease the number of slices 224 that are activated to decrease the amplitude of the drive current I(drive). Deselecting a greater number of slices 224 may cause variable current source 224 to drive a lower amount of the drive current I(drive) than in such instances where a lesser number of slices 224 is deselected. On such occasions, a decrease the number of slices 224 that are activated may cause a decrease in the operating frequency of measurement voltage V(chs).

Figure 4:
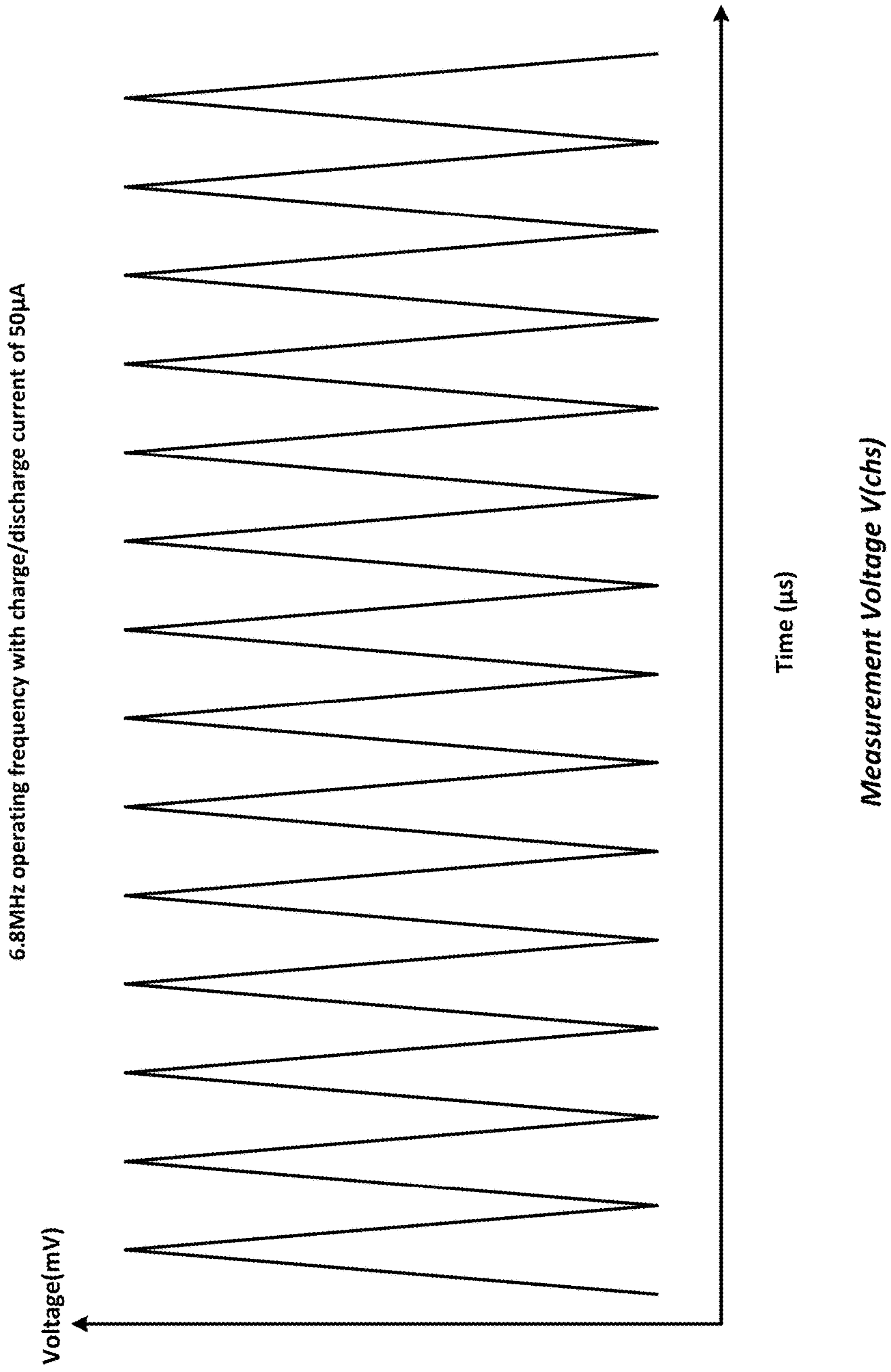
FIG. 4 illustrates an exemplary measurement voltage, in accordance with one or more embodiments of the disclosure.

Referring to FIG. 4, measurement voltage V(chs) in the form of another periodic waveform is illustrated. An operating frequency of 6.8 MHz for measurement voltage V(chs) in the example of FIG. 4 may happen to be the result of a 50 μA drive current I(drive). The amplitude of the drive current I(drive) in the example of FIG. 4 is greater than the amplitude of the drive current I(drive) in the example of FIG. 3. Due to the amplitude of the drive current I(drive) in the example of FIG. 4 being greater than the amplitude of the drive current I(drive) in the example of FIG. 3, the operating frequency of 6.8 MHz for measurement voltage V(chs) in the example of FIG. 4 is higher than the operating frequency of 1.4 MHz for measurement voltage V(chs) in the example of FIG. 3.

Figure 5:
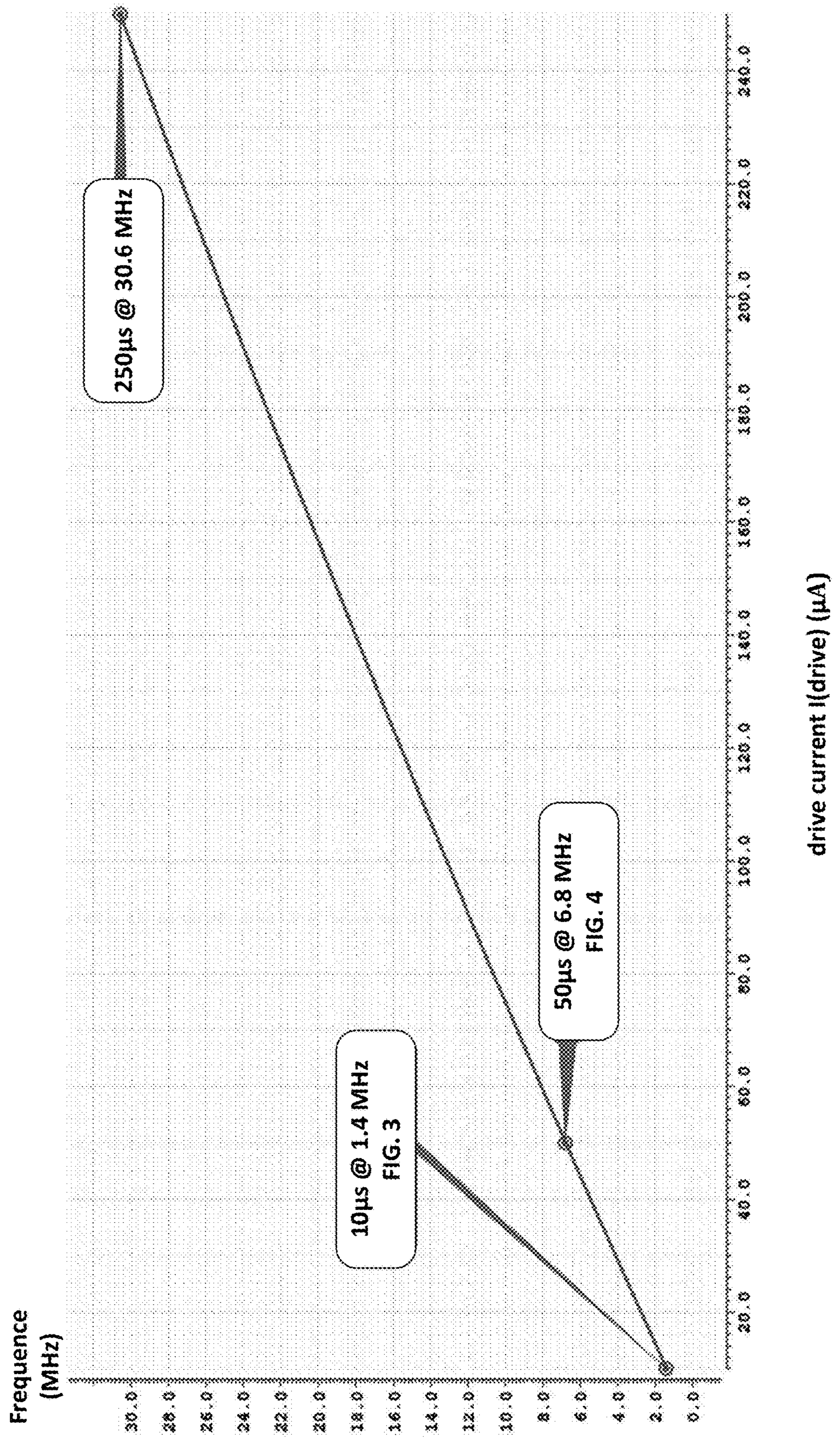
FIG. 5 illustrates an exemplary comparison, in accordance with one or more embodiments of the disclosure.

Referring to FIG. 5, a comparison in the operating frequency of measurement voltage V(chs) resulting from a variance in the amount of the drive current I(drive) is illustrated. The vertical axis of FIG. 5 may designate an operating frequency of measurement voltage V(chs) in megahertz (MHz) whereas the horizontal axis may designate amplitudes of drive current I(drive) in microamps (μA). In the example of FIG. 5, a linear relationship may exist between drive current I(drive) and the operating frequency of measurement voltage V(chs).

Figure 6:
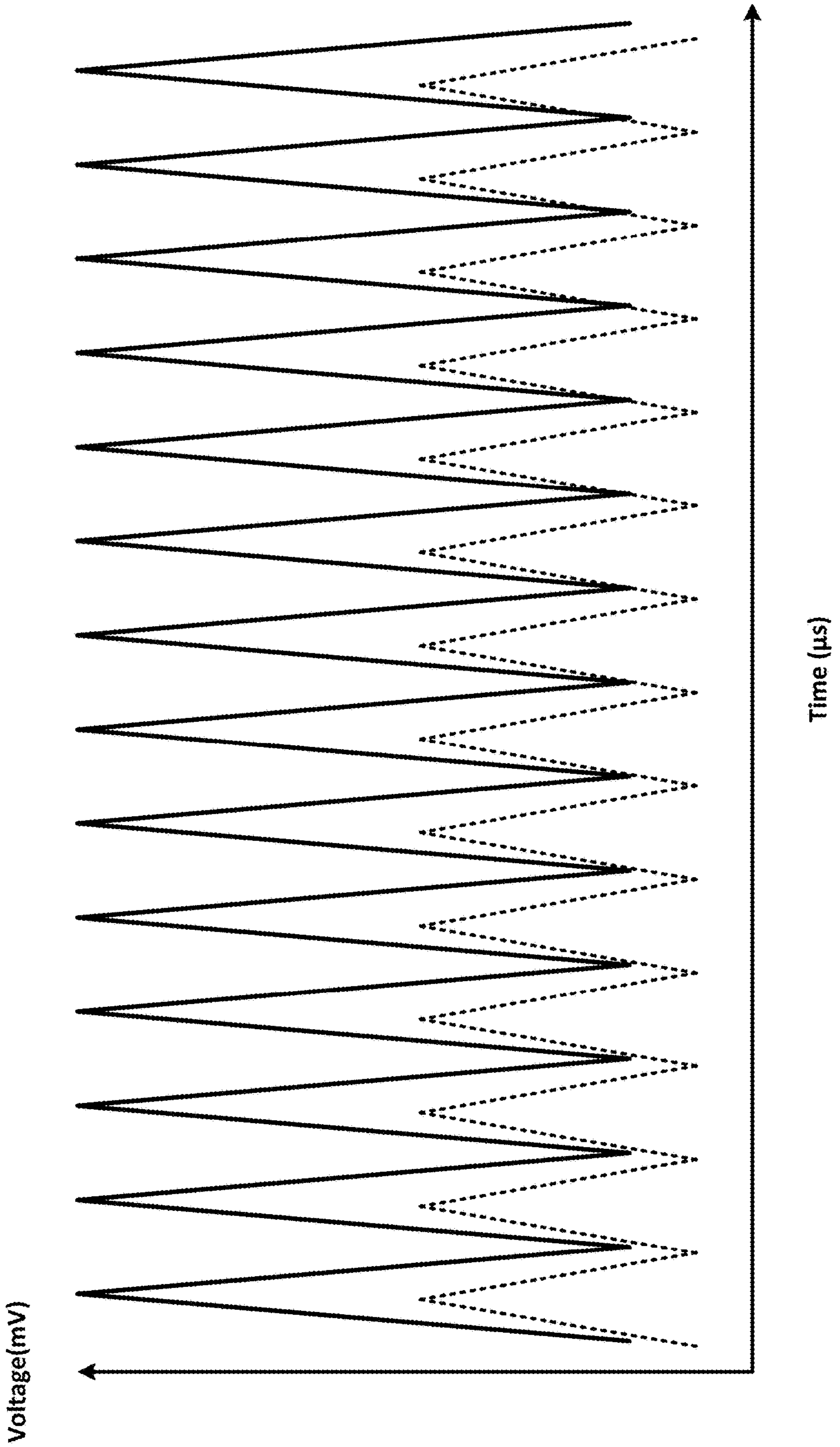
FIG. 6 illustrates an exemplary comparison, in accordance with one or more embodiments of the disclosure.

Referring to FIG. 6, a comparison resulting from a variance in the voltage level of the DC voltage from electrical power supply V(Ref) is illustrated. The voltage level for the DC voltage is a user-selectable parameter. FIG. 6 illustrates an instance where the DC voltage associated the taller waveform (solid line) is greater than the DC voltage associated the shorter waveform (dashed line). By way of example, the DC voltage associated with the taller waveform (solid line) may happen to be 1V whereas the DC voltage associated with the shorter waveform (dashed line) may happen to be 500 mV.

Figure 7:
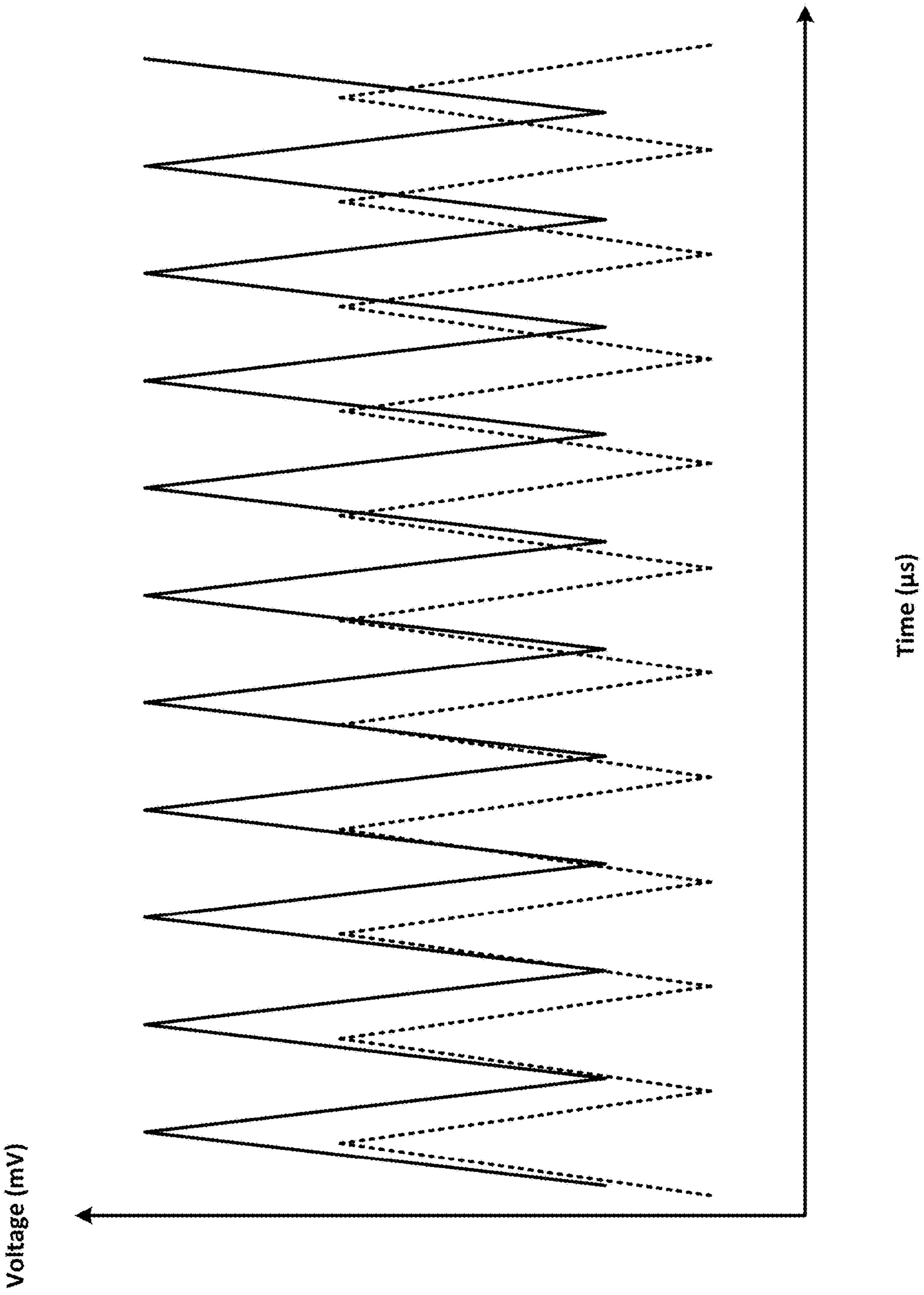
FIG. 7 illustrates an exemplary comparison, in accordance with one or more embodiments of the disclosure.

Referring to FIG. 7, a comparison resulting from adjusting the ratio of variable resistance R0 to variable resistance R1 ("the R0/R1 ratio") is illustrated. The resistive values of variable resistances R0, R1 are user-selectable parameters thereby giving the user a means to control the minimum and maximum voltage levels for the measurement voltage V(chs). For instance, oscillator 222 may identify the correct voltage levels to transition the measurement voltage V(chs) as a result of comparing the measurement voltage V(chs) against the reference voltage. Modifying the resistive value of either variable resistance R0, or variable resistance R1, or both variable resistance R0 and variable resistance R1 may alter the resistive value of the R0/R1 ratio.

Being that variable resistances R0 and R1 may exist as a resistive voltage divider circuit, the R0/R1 ratio may assist in establishing the voltage levels for the high and low thresholds of the reference voltage thereby providing a user a mechanism for controlling the minimum and maximum voltage levels of the measurement voltage V(chs) for the same value of the DC voltage from electrical power supply V(Ref). As an illustration, FIG. 7 is an example where the R0/R1 ratio associated with the dashed line waveform is greater than the R0/R1 ratio associated with the solid line waveform. By way of example, the R0/R1 ratio=2 may happen to be associated with the dashed line waveform whereas the R0/R1 ratio=0.5 may happen to be associated with the solid line waveform.

Figure 8:
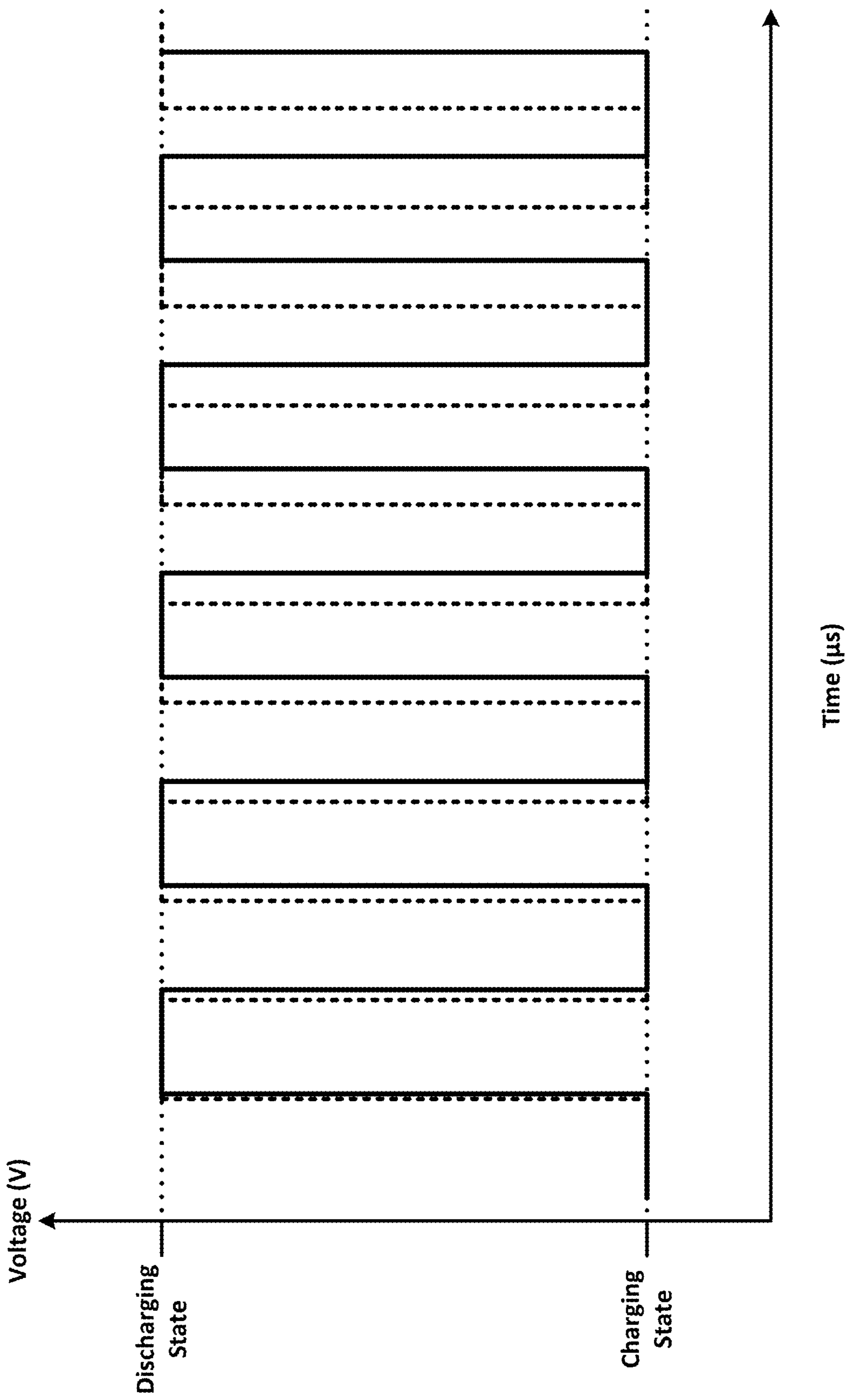
FIG. 8 illustrates exemplary oscillator-generated waveforms, in accordance with one or more embodiments of the disclosure.

Turning now to FIG. 8, oscillator-generated waveforms are illustrated. Node 2 serves as connection point linking variable current source 224 with an output of oscillator 222. The oscillator-generated waveforms in the example of FIG. 8 may appear at node 2.

Oscillator 222 may cycle each of the oscillator-generated waveforms between voltage levels. One of the voltage levels represents a discharging state. Another of the voltage levels represents a charging state. For instance, oscillator 222 may compare measurement voltage V(chs) appearing at node 3 against a reference voltage appearing at node 1 to detect whether measurement voltage V(chs) is greater than the high threshold or less than the low threshold.

Upon detecting that measurement voltage V(chs) is greater than the high threshold, oscillator 222 may transition an oscillator-generated waveform to the discharging state. At the discharging state, the oscillator-generated waveform may cause variable current source 224 to cease flowing the drive current I(drive). Variable current source 224 remains inactive and inhibits flowing the drive current I(drive) until oscillator 222 transitions the oscillator-generated waveform to the charging state. The oscillator-generated waveform at the discharging state may also cause transistor QN1 to pull fixed resistors R2, R3 to ground. Pulling fixed resistors R2, R3 to ground may adjust the effective resistance at node 1 such that the reference voltage is set to the low threshold.

Upon detecting measurement voltage V(chs) as being lower than the low threshold, oscillator 222 may transition the oscillator-generated waveform to the charging state. At the charging state, the oscillator-generated waveform may cause variable current source 224 to commence flowing the drive current I(drive). Variable current source 224 remains active and flows the drive current I(drive) until oscillator 222 transitions the oscillator-generated waveform to the discharging state. The oscillator-generated waveform at the charging state may also cause transistor QN1 to disconnect resistors R2, R3 from ground. Disconnecting resistors R2, R3 from ground may adjust the effective resistance at node 1 such that the reference voltage is set to the high threshold.

For simplicity and ease of understanding, FIG. 8 shows a case in which comparative oscillator-generated waveforms are superimposed on one another. By way of illustration, the solid line waveform in FIG. 8 may portray an oscillator-generated waveform at node 2 during a time period whereas the dashed line waveform in FIG. 8 may portray an oscillator-generated waveform at node 2 during another time period.

The solid line waveform and the dashed line waveform are oscillator-generated waveforms of varied frequencies. Frequency differences between the solid line waveform and the dashed line waveform are the result of variances in the flying height. Referred to herein, a "flying height" is the distance between capacitive height sensor 111 and a target object. The distance from capacitive height sensor 111 to the target object at a higher flying height is longer than the distance at a lower flying height. The solid line waveform in FIG. 8 may represent the timing resulting from a higher flying height at one time period whereas the dashed line waveform in FIG. 8 may represent the timing resulting from a lower flying height at another time period.

Capacitive height sensor 111 may measure or detect the sensing capacitance between capacitive height sensor 111 and the target object to precisely monitor the flying height. Referred to herein, "sensing capacitance" is the capacitance measured or detected by capacitive height sensor 111 in response to changes in the flying height. The sensing capacitance may change inversely to the flying height. Specifically, the sensing capacitance may increase as the flying height decreases. Conversely, the sensing capacitance may decrease as the flying height increases.

In the example of FIG. 8, frequencies of oscillator-generated waveforms are dependent on the magnitude of the sensing capacitance. For instance, the oscillation frequency for the dashed line waveform in FIG. 8 may happen to be higher than the oscillation frequency for the solid line waveform. In such cases, the larger sensing capacitance due to the higher flying height as is present with the solid line waveform may lead to a slower rate of charging and discharging capacitive height sensor 111. Whereas the smaller sensing capacitance due to the lower flying height as is present with the dashed line waveform may lead to a faster rate of charging and discharging capacitive height sensor 111.

Slider control 223 is a circuit that detects frequency changes that may occur in an oscillator-generated waveform. For instance, slider control 223 may detect frequency changes in the oscillator-generated waveform using methods such as period measurement, frequency counting, pulse width measurement, edge detection, phase-locked loops (PLLs) and/or other signal processing methods. By way of example, slider control 223 may count the number of oscillator-generated waveform cycles that may occur within a fixed time interval. As another example, slider control 223 may count the number of edges which occur within a fixed time interval, allowing calculation of the oscillator frequency. A change in the count in either example may indicate a change in the oscillator frequency of the oscillator-generated waveform. The change in the count may provide information regarding the distance of the flying height. Slider control 223 may convert a result of the detected frequency change into a slider bias signal and output the slider bias signal to slider 110. The slider bias signal may cause movement of slider 110 relative to changes in the flying height.

Those skilled in the art will also appreciate the arrangement or interconnection of components such as "coupled," "connected," "on," "under," or similar wording allows for indirect connections, or intervening components or layers.

Certain operations of methods according to the technology, or of systems executing those methods, may be represented schematically in the figures or otherwise discussed herein. Unless otherwise specified or limited, representation in the figures of particular operations in particular spatial order may not necessarily require those operations to be executed in a particular sequence corresponding to the particular spatial order. Correspondingly, certain operations represented in the figures, or otherwise disclosed herein, may be executed in different orders than are expressly illustrated or described, as appropriate for particular examples of the technology. Further, in some examples, certain operations may be executed in parallel or partially in parallel, including by dedicated parallel processing devices, or separate computing devices configured to interoperate as part of a large system.

As used herein, unless otherwise limited or defined, "or" indicates a non-exclusive list of components or operations that may be present in any variety of combinations, rather than an exclusive list of components that may be present only as alternatives to each other. For example, a list of "A, B, or C" indicates options of: A; B; C; A and B; A and C; B and C; and A, B, and C.

Correspondingly, the term "or" as used herein is intended to indicate exclusive alternatives only when preceded by terms of exclusivity, such as, e.g., "either," "only one of," or "exactly one of." Further, a list preceded by "one or more" (and variations thereon) and including "or" to separate listed elements indicates options of one or more of any or all of the listed elements.

For example, the phrases "one or more of A, B, or C" and "at least one of A, B, or C" indicate options of: one or more A; one or more B; one or more C; one or more A and one or more B; one or more B and one or more C; one or more A and one or more C; and one or more of each of A, B, and C.

Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C.

In general, the term "or" as used herein only indicates exclusive alternatives (e.g., "one or the other but not both") when preceded by terms of exclusivity, such as, e.g., "either," "only one of," or "exactly one of."

Any mark, if referenced herein, may be common law or registered trademarks of third parties affiliated or unaffiliated with the applicant or the assignee. Use of these marks is by way of example and shall not be construed as descriptive or to limit the scope of disclosed or claimed embodiments to material associated only with such marks.

The articles "a," "an," and "the" are intended to include the plural forms as well, unless the context clearly indicates otherwise.

The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Throughout the application, ordinal numbers (e.g., first, second, third, and so forth) may be used as an adjective for an element (i.e., any noun in the application).

Although terms such as "first," "second," and "third" may be used herein to describe various members, components, regions, layers, or sections, these members, components, regions, layers, or sections are not to be limited by these terms.

Rather, these terms are only used to distinguish one member, component, region, layer, or section from another member, component, region, layer, or section.

The use of ordinal numbers is not to imply or create any particular ordering of the elements nor to limit any element to being only a single element unless expressly disclosed, such as by the use of the terms "before," "after," "single," and other such terminology.

Rather, the use of ordinal numbers is to distinguish between the elements.

By way of an example, a first element is distinct from a second element, and the first element may encompass more than one element and succeed (or precede) the second element in an ordering of elements.

Thus, a first member, component, region, layer, or section referred to in examples described herein may also be referred to as a second member, component, region, layer, or section without departing from the teachings of the examples.

What is claimed is:

1. An apparatus comprising:

a current source configured to:

transform a positive voltage into a drive current, and provide, to bring about a measurement voltage between a sensor and a target object, the drive current to the sensor, wherein the current source comprises a plurality of slices, each slice is configured to individually flow a predetermined amount of the drive current; and an oscillator configured to:

prevent, in response to detecting that the measurement voltage is greater than a first threshold, the current source from flowing the drive current, and enable, in response to detecting that the measurement voltage is less than a second threshold, the current source to commence flowing the drive current, wherein the first threshold is a voltage level higher than the second threshold; and wherein a frequency of the measurement voltage is proportional to the amplitude of the drive current.

2. The apparatus according to claim 1, wherein the oscillator is configured to compare the measurement voltage against a reference voltage to detect whether the measurement voltage is greater than the first threshold or less than the second threshold.

3. The apparatus according to claim 2, wherein the oscillator is configured to set, upon detecting that the measurement voltage is greater than the first threshold, the reference voltage to the second threshold.

4. The apparatus according to claim 2, wherein the oscillator is configured to set, upon detecting that the measurement voltage is greater than the second threshold, the reference voltage to the first threshold.

5. The apparatus according to claim 1, further comprising:

a constant current source configured to transform the positive voltage into a second current, an amplitude of the second current being constant and unvarying.

6. The apparatus according to claim 5, wherein an amplitude of the drive current is proportional to the amplitude of the second current.

7. The apparatus according to claim 1, wherein each of the slices is configured to individually adjust an amplitude of the drive current.

8. The apparatus according to claim 1, wherein the sensor is configured to accumulate, in response to receiving the drive current, a charge in the sensor.

9. The apparatus according to claim 1, wherein the measurement voltage exists as a triangle wave.

10. The apparatus according to claim 1, further comprising:

a current sink configured to draw a sink current to a negative voltage rail.

11. The apparatus according to claim 10, wherein the current sink is configured to discharge the sensor in response to drawing the sink current to the negative voltage rail.

12. The apparatus according to claim 10, wherein the current sink is configured to discharge the sensor in response to the oscillator causing the current source to cease providing the drive current from the positive voltage.

13. The apparatus according to claim 10, wherein the negative voltage rail is configured to provide, to the current sink, a voltage potential that is negative relative to ground.

14. The apparatus according to claim 1, wherein the current source is configured to provide, to the sensor, a constant amount of the drive current from the positive voltage.

15. The apparatus according to claim 1, wherein the positive voltage is configured to provide, to the current source, a voltage that is positive relative to ground.

16. The apparatus according to claim 1, further comprising:

a square wave generator configured to convert the measurement voltage into a square wave.

17. A method comprising:

detecting, by a capacitive height sensor to monitor variances in a flying height, capacitance between a read/write head and a disk surface;

provided, by a conditioning circuit to generate a voltage between the capacitive height sensor and a target object, a drive current to the capacitive height sensor;

cease, by the conditioning circuit in response to detecting that the voltage is greater than a first threshold, flowing the drive current to the capacitive height sensor; and commence, by the conditioning circuit in response to detecting that the voltage is less than a second threshold, flowing the drive current to the capacitive height sensor, wherein the first threshold is a voltage level higher than the second threshold; and wherein a frequency of the voltage is proportional to the amplitude of the drive current.

18. An assembly comprising:

a capacitive height sensor configured to:

detect, to monitor variances in a flying height, capacitance between a read/write head and a disk surface; and a conditioning circuit configured to:

provide, to bring about a voltage between the capacitive height sensor and the disk surface, a drive current to the capacitive height sensor, cease, in response to detecting that the voltage is greater than a first threshold, providing the drive current to the capacitive height sensor, and commence, in response to detecting that the voltage is less than a second threshold, providing the drive current to the capacitive height sensor, wherein the first threshold is a voltage level higher than the second threshold; and wherein a frequency of the voltage is proportional to the amplitude of the drive current.

* * * * *